(12) United States Patent
Cope et al.

(10) Patent No.: US 7,978,843 B1
(45) Date of Patent: Jul. 12, 2011

(54) CALL PROCESSING SYSTEM

(75) Inventors: Warren B. Cope, Olathe, KS (US); Ramaswami Rangarajan, Belmont, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 2257 days.

(21) Appl. No.: 10/714,030

(22) Filed: Nov. 14, 2003

(51) Int. Cl.
*H04M 7/00* (2006.01)

(52) U.S. Cl. .......... 379/221.14; 379/221.08; 379/221.09

(58) Field of Classification Search ............ 379/220.01, 379/221.08, 221.09, 221.14
See application file for complete search history.

(56) References Cited

U.S. PATENT DOCUMENTS

| | | | | |
|---|---|---|---|---|
| 5,521,969 | A * | 5/1996 | Paulus et al. | 379/142.02 |
| 5,677,683 | A * | 10/1997 | Kawasaki et al. | 370/351 |
| 5,712,908 | A * | 1/1998 | Brinkman et al. | 379/114.28 |
| 5,757,894 | A * | 5/1998 | Kay et al. | 379/127.03 |
| 5,912,946 | A * | 6/1999 | Michelson | 379/15.04 |
| 5,953,331 | A * | 9/1999 | Duncan et al. | 370/352 |
| 6,130,940 | A * | 10/2000 | Wong et al. | 379/221.09 |
| 6,324,272 | B1 * | 11/2001 | Abu-Shukhaidem et al. | 379/142.06 |
| 6,490,450 | B1 * | 12/2002 | Batni et al. | 455/433 |
| 2007/0263644 | A1 * | 11/2007 | Christie et al. | 370/401 |

* cited by examiner

*Primary Examiner* — Rasha S Al Aubaidi (57) ABSTRACT

A call processing system for handling a call comprising a signaling interface configured to receive an initial address message wherein the initial address message identifies a calling party number, a processing system configured to process the calling party number to determine if the calling party number is in a first format accepted by a routing system and modify the initial address message if the calling party number is in a second format not accepted by the routing system, and the signaling interface further configured to transmit the modified initial address message to the routing system.

17 Claims, 9 Drawing Sheets

CALL PROCESSING SYSTEM

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the communications field, and in particular, to call processing systems and methods.

2. Description of the Prior Art

Mobile communications carriers typical handle calls connected from a mobile carrier network to destinations located on other networks such as the public switched telephone network (PSTN). To connect such a call destined for the PSTN, a mobile carrier routes the call from a mobile switch of their mobile network to a domestic switch of the PSTN. For example, the mobile carrier could route the call to a class 4 switch of the PSTN such as the DMS-250 offered by Nortel Networks, Inc.

During call setup, the mobile switch transmits call signaling to the domestic switch for call processing. The call signaling indicates the calling party number for the mobile phone which is used by the domestic switch to determine whether or not to connect the call and how to connect the call. For instance, the domestic switch might reject the call if the calling party number (CPN) indicates a customer that has delinquent bills. However, a problem arises when the CPN adheres to a format incompatible with a format recognized by the domestic switch therefore precluding the domestic switch from conducting call processing based on the CPN. For example, the DMS-250 class 4 switch recognizes CPNs that adhere to the North American Dialing Plan (NADP). If the CPN does not fit the NADP, the DMS-250 class 4 switch rejects the call.

Mobile carriers desire to provide international roaming services to customers, but these customers have calling party numbers that adhere to international formats and not the NADP. Thus, when the mobile carrier switch attempts to connect an international roaming call to the PSTN, the domestic switch of the PSTN does not recognize the international format of the calling party number and cannot conduct call processing based on the CPN. Lacking the ability to process the CPN, the domestic switch rejects the call.

SUMMARY OF THE INVENTION

An embodiment of the invention includes a call processing system for handling a call comprising a signaling interface configured to receive an initial address message wherein the initial address message identifies a calling party number, a processing system configured to process the calling party number to determine if the calling party number is in a first format accepted by a routing system and modify the initial address message if the calling party number is in a second format not accepted by the routing system, and the signaling interface further configured to transmit the modified initial address message to the routing system.

In some embodiments of the invention, the routing system comprises a switch of a public switched telephone network (PSTN).

In some embodiments of the invention, the signaling interface receives the initial address message from a mobile carrier switch.

In some embodiments of the invention, the processing system is configured to determine if a field of the initial address message is populated and populate the field if the field is not populated.

In some embodiments of the invention, the field comprises a charge number field and the charge number field is populated with a charge number.

In some embodiments of the invention, the field comprises an originating line identification field and the originating line identification field is populated with an originating line identification number.

In some embodiments of the invention, the routing system is configured to receive the modified initial address message and allow the call based on the charge number.

In some embodiments of the invention, the routing system is configured to receive the modified initial address message and allow the call based on the originating line identification number.

In some embodiments of the invention, the first format is compatible with the North American Dialing Plan.

In some embodiments of the invention, the call processing system comprises a service control point (SCP).

BRIEF DESCRIPTION OF THE DRAWINGS

The same reference number represents the same element on all drawings.

DETAILED DESCRIPTION OF THE PREFERRED EMBODIMENT

FIGS. 1-9 and the following description depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described below can be combined in various ways to form multiple embodiments of the invention. As a result, the invention is not limited to the specific embodiments described below, but only by the claims and their equivalents.

First Embodiment Configuration and Operation

Figure 1:
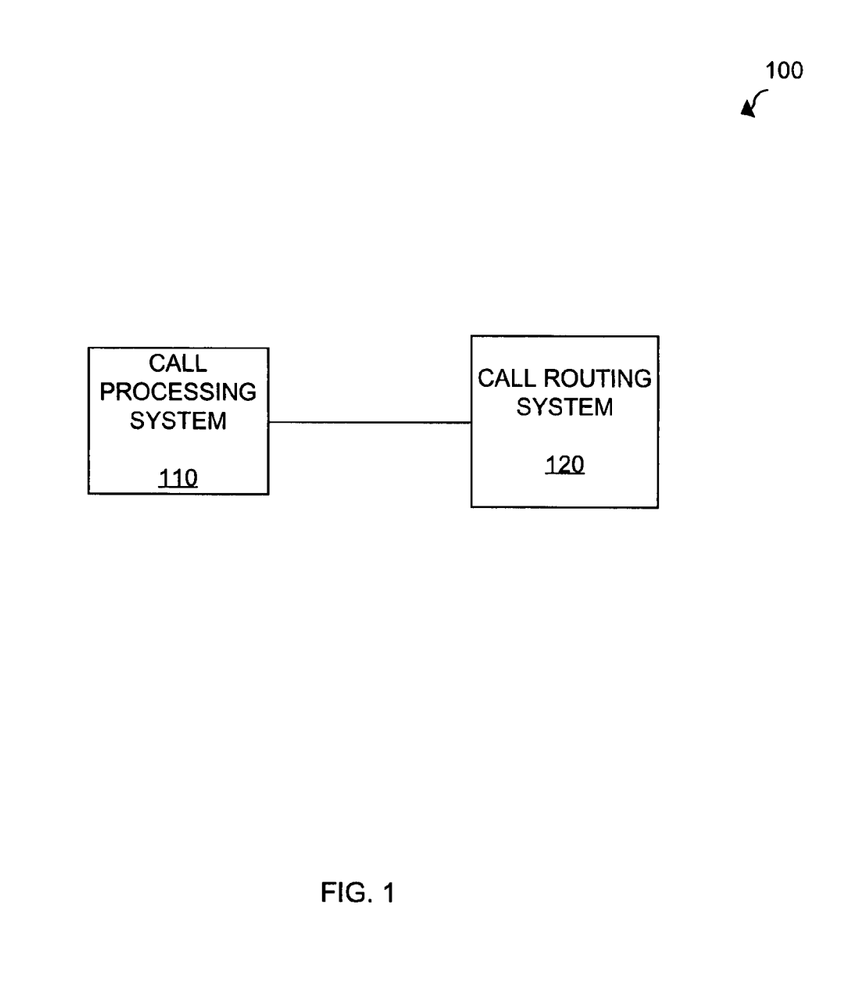
FIG. 1 illustrates a communication system in an embodiment of the invention.
Figure 2:
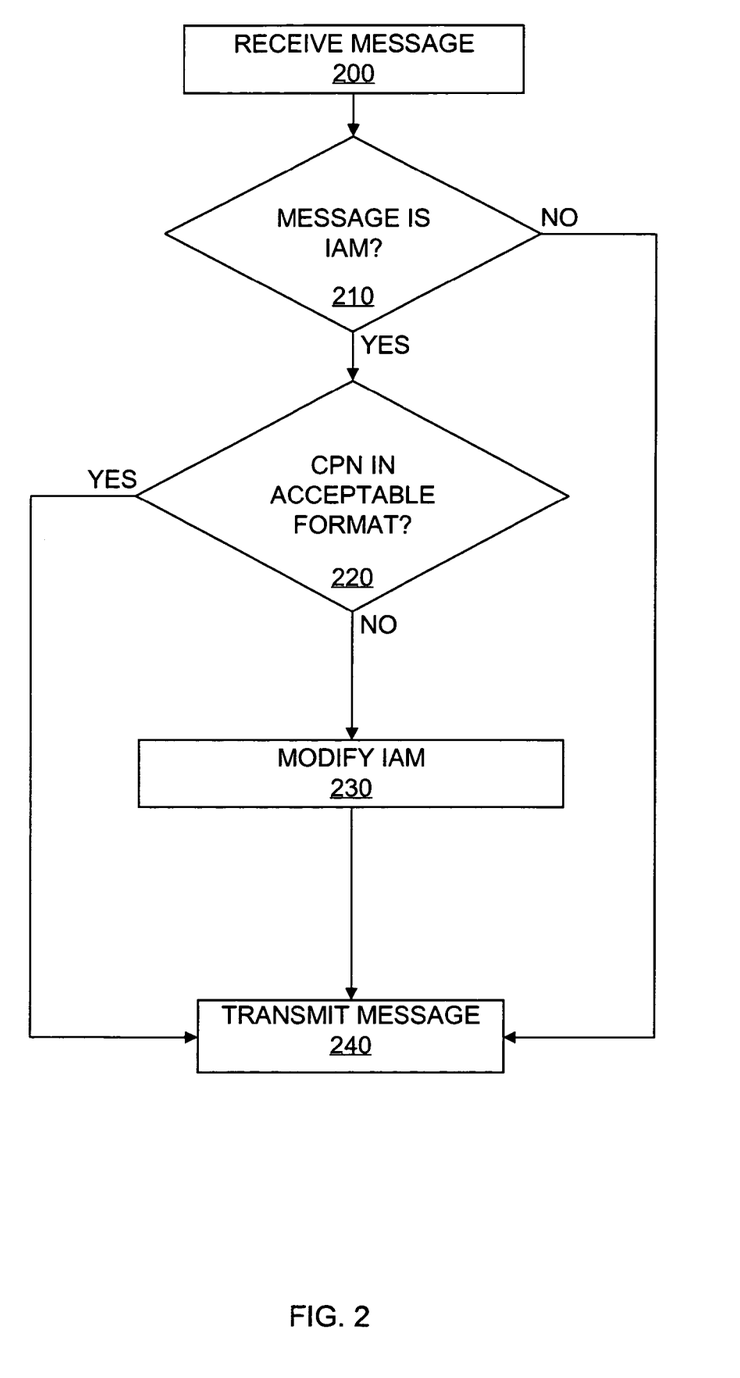
FIG. 2 illustrates a flowchart for a call processing system in an embodiment of the invention.

FIGS. 1-2

FIG. 1 illustrates communication system 100 in an embodiment of the invention. Communication system 100 includes call processing system 110 connected to call routing system 120. Call processing system could comprise a service control point (SCP) or other similar call processing equipment. Call routing system 120 could comprise a switch of the Public Switched Telephone Network (PSTN).

FIG. 2 illustrates a flowchart describing the operation of communication system 100 in an embodiment of the invention. Call processing system 110 receives a message (Step 200) and determines if the message is an initial address message (IAM) (Step 210). If the message is not an IAM, call processing system 110 transmits the message for any remaining call processing (Step 240) to routing system 120. If the message is an IAM, call processing system 110 determines if the calling party number stored in the calling party number field of the IAM is in an acceptable format (Step 220). If the format is acceptable, call processing system 110 transmits the message for any remaining call processing (Step 240) to routing system 120. If the format is not acceptable, call processing system 110 modifies the IAM (Step 230). Next, call processing system 110 transmits the message for any remaining call processing (Step 240) to routing system 120.

Second Embodiment Configuration and Operations

Figure 3:
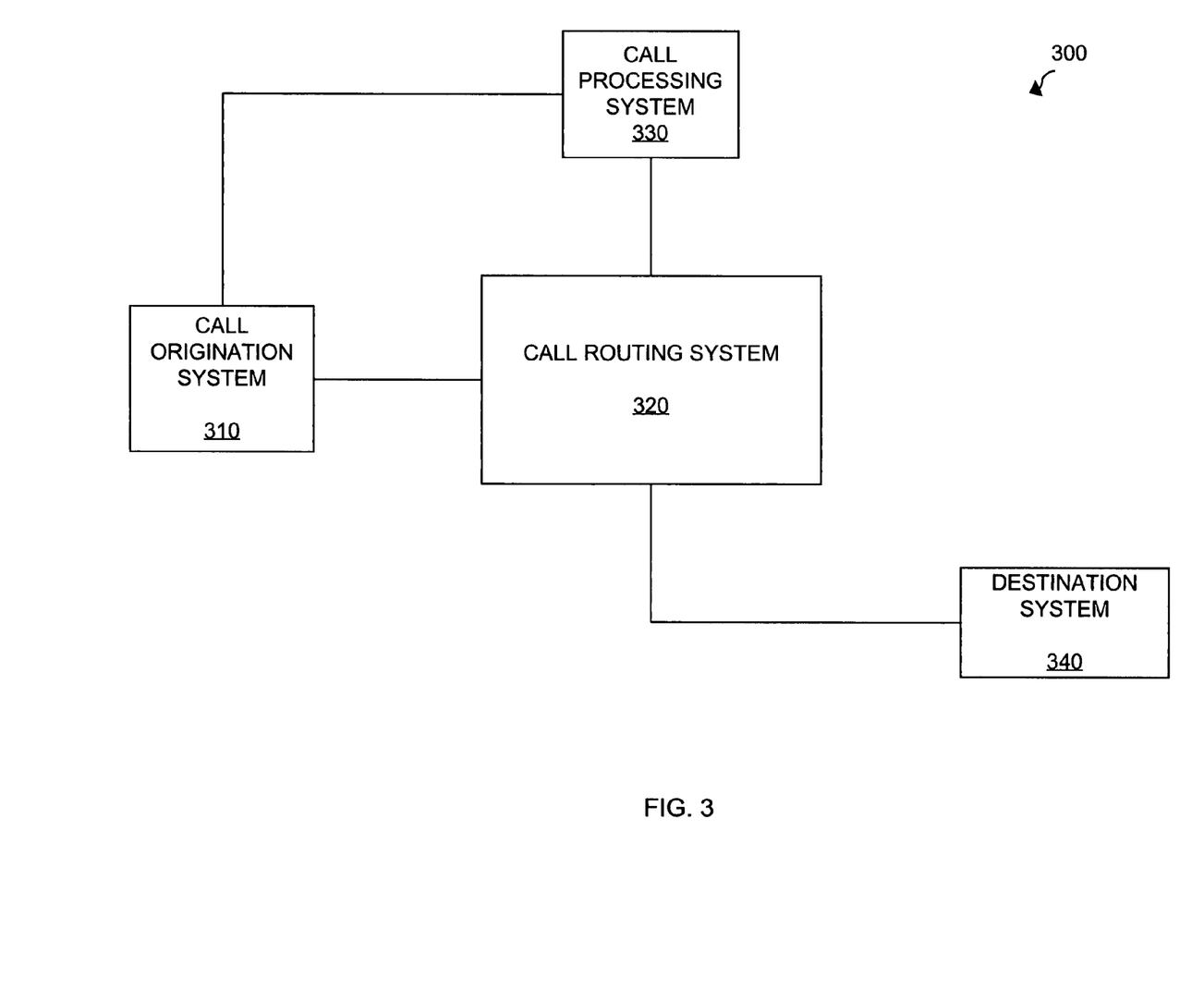
FIG. 3 illustrates a communication system in an embodiment of the invention.
Figure 4:
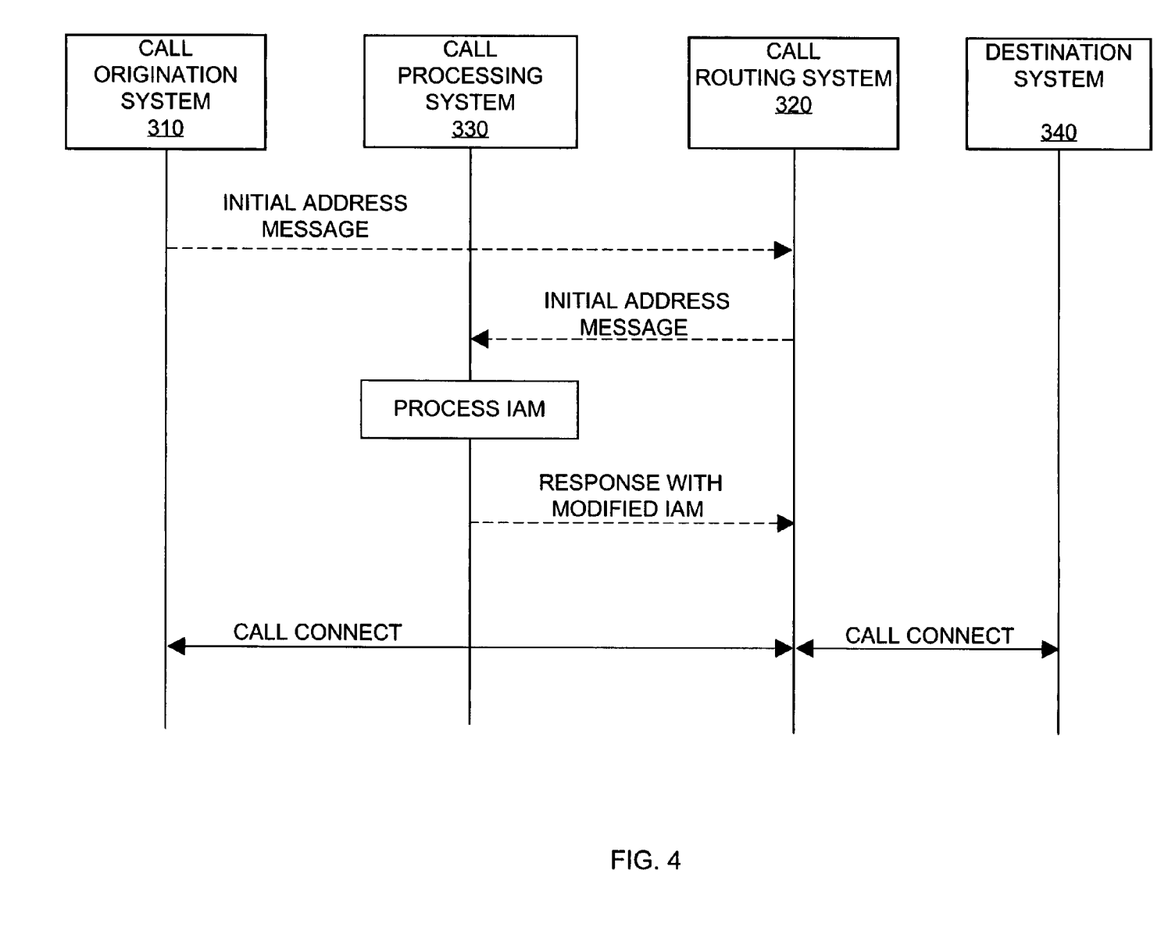
FIG. 4 illustrates the operation of a communication system in an embodiment of the invention.
Figure 5:
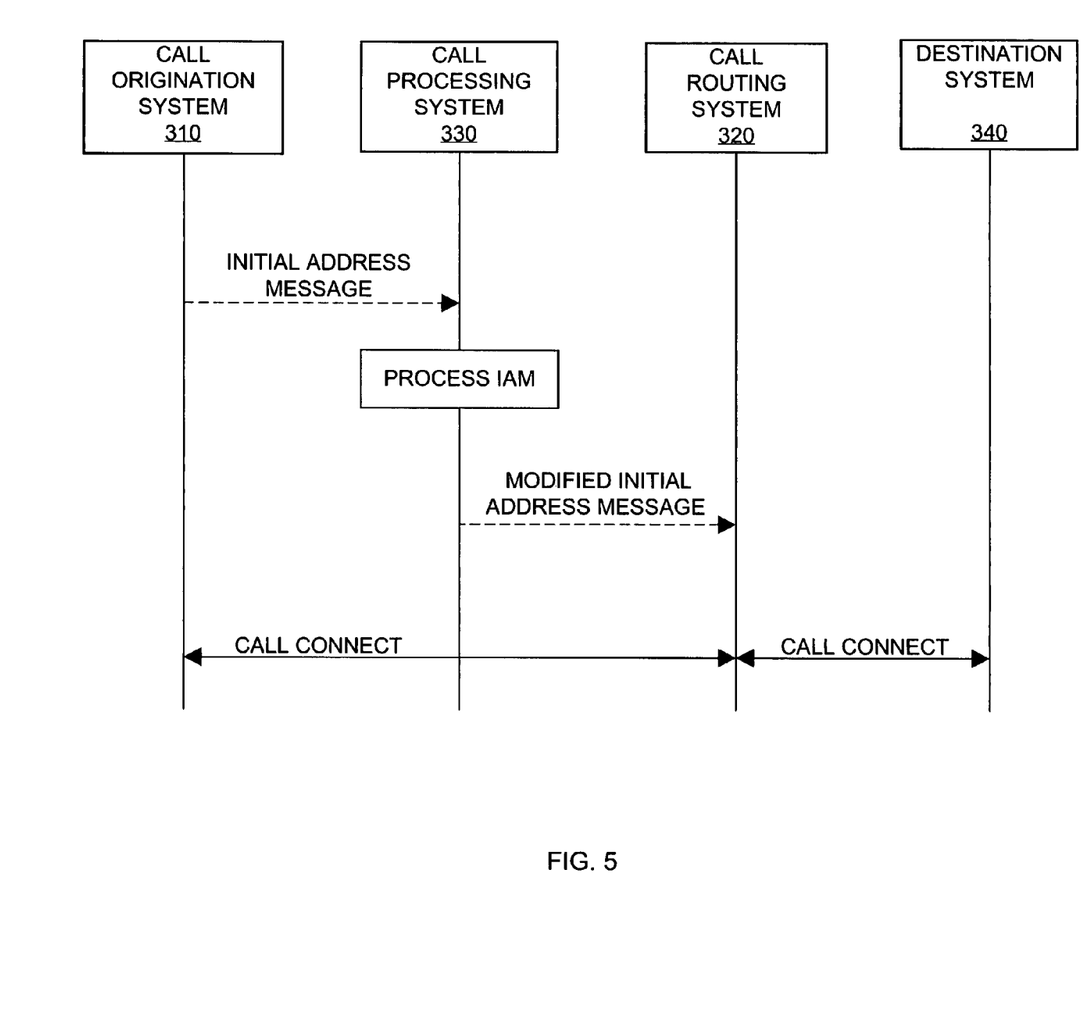
FIG. 5 illustrates the operation of a communication system in an embodiment of the invention.

FIGS. 3-5

FIG. 3 illustrates communication system 300 in an embodiment of the invention. Communication system 300 includes call origination system 310, call routing system 320, call processing system 330, and destination system 340. Call processing system 330 is coupled to call origination system 310 and call routing system 320. Call routing system 320 is connected to call origination system 310 and destination system 340. Call origination system 310 could comprise a switch of the public switched telephone network (PSTN) or a mobile telephone switch operated by a wireless telecommunications carrier. Call routing system 320 comprises a collection of switches in the PSTN. Call processing system 330 comprises a service control point (SCP). Destination system 340 could comprise a switch, a mobile switch, a destination device such as a telephone, or a combination of such elements.

FIG. 4 illustrates the operation of communication system 300 in an embodiment of the invention. Call origination system 310 transmits an initial address message (IAM) for a call to call routing system 320. Call routing system 320 receives the IAM and sends the IAM to call processing system 330. Call processing system 330 receives the IAM and processes the calling number field in the IAM to determine if the calling party number fits an acceptable format. If the calling party does not fit an acceptable format, call processing system 330 modifies the IAM. The IAM is modified based upon requirements of call routing system 320 to allow call connection through routing system 320 to destination system 340. Call processing system 330 sends the modified IAM to call routing system 320. The call is then connected from call origination system 310 to destination system 340.

FIG. 5 illustrates the operation of communication system 300 in an embodiment of the invention. Call origination system 310 transmits an initial address message (IAM) for a call to call processing system 330. Call processing system 330 receives the IAM and processes the calling number field in the IAM to determine if the calling party number fits an acceptable format. If the calling party does not fit an acceptable format, call processing system 330 modifies the IAM. The IAM is modified based upon requirements of call routing system 320 to allow call connection through routing system 320 to destination system 340. Call processing system 330 sends the modified IAM to call routing system 320. The call is then connected from call origination system 310 to destination system 340.

Third Embodiment Configuration and Operations

Figure 6:
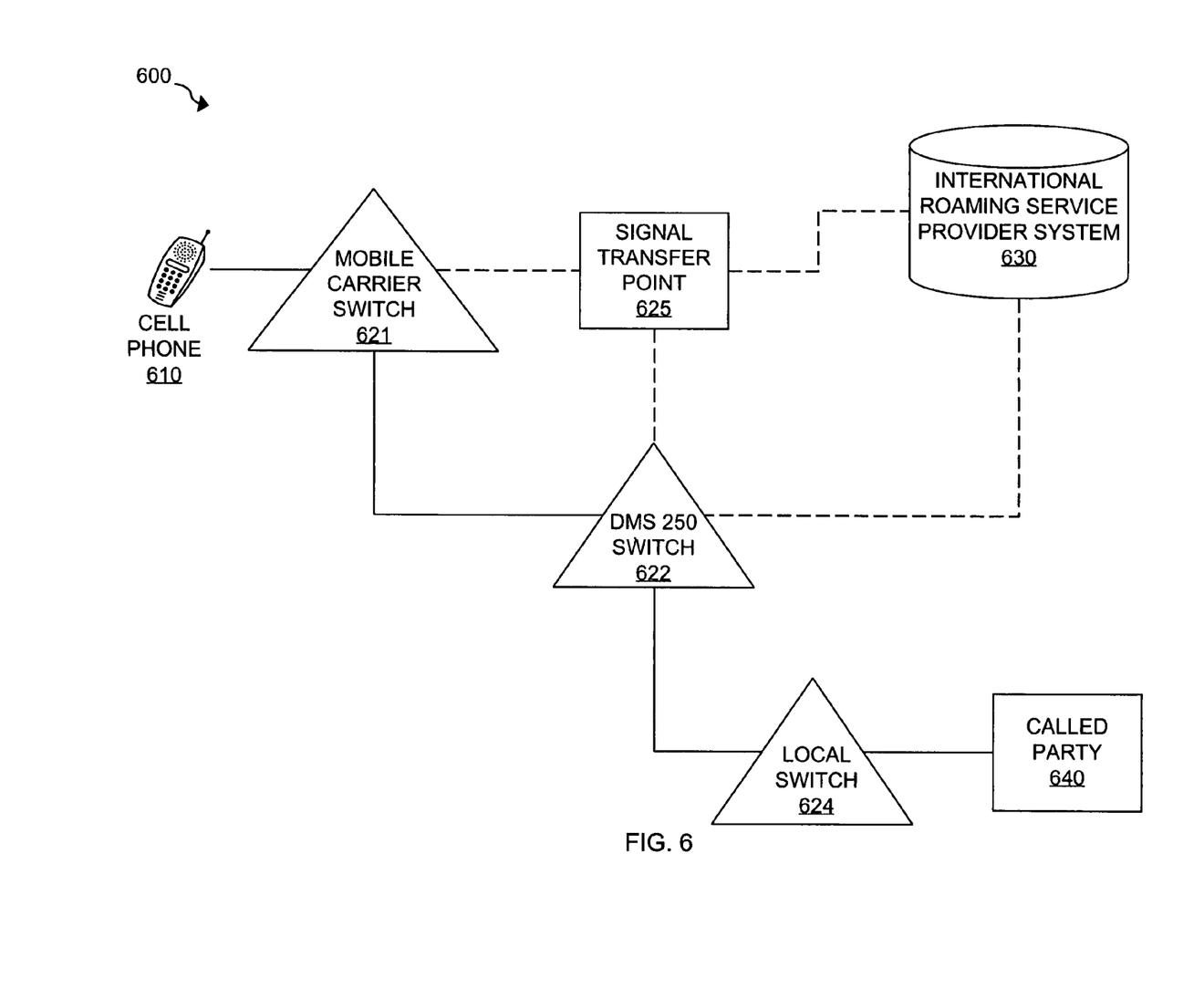
FIG. 6 illustrates a communication system in a embodiment of the invention.
Figure 7:
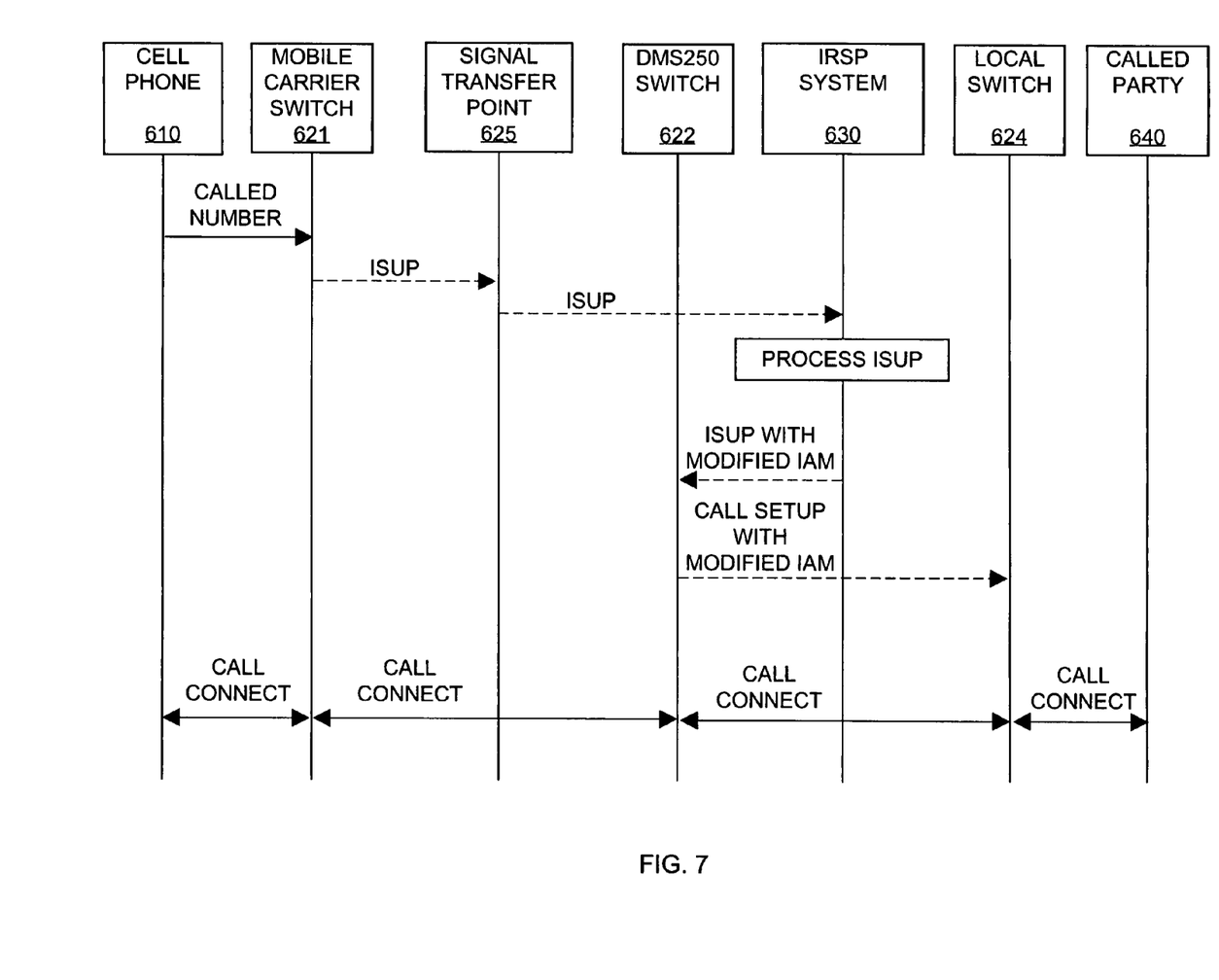
FIG. 7 illustrates the operation of a communication system in an embodiment of the invention.
Figure 8:
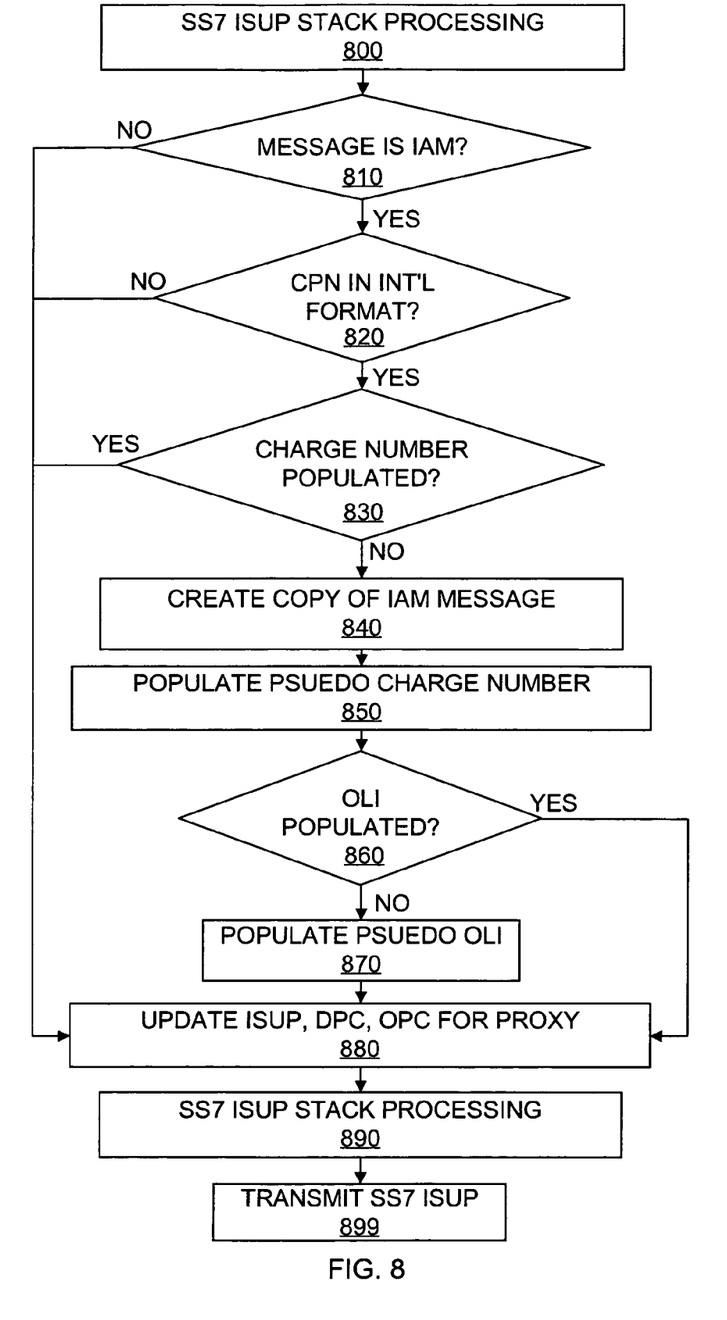
FIG. 8 illustrates a flowchart for a communication system in an embodiment of the invention.

FIGS. 6-8

FIG. 6 illustrates communication system 600 in an embodiment of the invention. Communication system 600 includes cell phone 610, mobile carrier switch 621, signal transfer point (STP) 625, international roaming service provider system (IRSP) 630, class 4 switch 622, local switch 624, and called party 640. Cell phone 610 connects to mobile carrier switch 621 by a wireless connection. Class 4 switch 622 is connected to mobile carrier switch 621 and local switch 624. STP 625 is connected to mobile carrier switch 621, class 4 switch 622, and IRSP 630. STP 625 could also be connected to local switch 624 although that is not shown for clarity. IRSP 630 comprises an SCP. Called party 640 is connected to local switch 624. Local switch 624 could comprise a central office switch, a central branch exchange (CBX), or any other similar type of switching equipment that connects called party 640 to the PSTN.

FIG. 7 illustrates the operation of communication system 600 in an embodiment of the invention. In this embodiment, cell phone 610 is a foreign device roaming on a domestic network. Cell phone 610 sends a called number to mobile carrier switch 621. Mobile carrier switch 621 typically sends an integrated services digital network user part (ISUP) message to STP 625. STP 625 receives the ISUP message and passes the ISUP message to IRSP 630. STP 625 passes the ISUP message to IRSP 630 based upon a determination that the OPC included in the ISUP message indicates that the ISUP message originated from mobile carrier switch 621. Alternatively, STP 625 could pass the ISUP message to IRSP 630 based upon a determination that destination point code (DPC) included in the ISUP message indicates IRSP 630 as the destination for the ISUP message.

IRSP receives the ISUP message and passes any ISUP message that is not an IAM to class 4 switch 622 without any further processing. If the ISUP message is an IAM, IRSP 630 inspects the calling number in the IAM to determine if the calling number fits an acceptable format. If the calling number fits the appropriate format, IRSP 630 sends the unmodified IAM to class 4 switch 622. If the calling number does not fit the appropriate format, IRSP 630 modifies the IAM. The IAM is modified based upon requirements of DSM 250 switch 622. If the calling number fits an international format, IRSP 630 modifies the IAM so that class 4 switch 622 will connect the call. Class 4 switch 622 receives the modified IAM, proceeds with call setup messaging, and connects the call from cell phone 610 to called party 640.

FIG. 8 illustrates a flowchart that describes the operation of communication system 600 in an embodiment of the invention. Mobile carrier 621 passes an ISUP message to STP 625.

STP 625 passes the ISUP message to ISRP for SS7 ISUP stack processing (Step 800). IRSP determines if the message is an IAM (Step 810). If the ISUP message is not an IAM, IRSP updates the DPC and OPC (Step 880), completes any remaining SS7 ISUP stack processing (Step 890), and transmits the ISUP message to class 4 switch 625 (Step 899).

If the ISUP message is an IAM, IRSP 630 determines if the calling party number (CPN) in the calling party field of the IAM is in an international format (Step 820). If the CPN is not in an international format, IRSP updates the destination point code (DPC) and origination point code (OPC) (Step 880), completes any remaining SS7 ISUP stack processing (Step 890), and transmits the ISUP message to class 4 switch 625 (Step 899). If the CPN is in an international format, IRSP next determines if the charge number field of the IAM is populated (Step 830).

If the charge number field is populated, IRSP updates the DPC and OPC (Step 880), completes any remaining SS7 ISUP stack processing (Step 890), and transmits the ISUP message to class 4 switch 625 (Step 899). If the charge number field is not populated, IRSP 630 creates a copy of the IAM message (Step 840) and populates the charge number field with a pseudo charge number (Step 850).

Next, IRSP 630 determines if the originating line information (OLI) field is populated (Step 860). If the OLI field is populated, IRSP updates the DPC and OPC (Step 880), completes any remaining SS7 ISUP stack processing (Step 890), and transmits the ISUP message to class 4 switch 625 (Step 899). If the OLI field is not populated, IRSP 630 populates the OLI field with a pseudo OLI (Step 870), updates the DPC and OPC (Step 880), completes any remaining SS7 ISUP stack processing (Step 890), and transmits the ISUP message to class 4 switch 625 (Step 899).

Class 4 switch 625 receives the ISUP message and connects the call. Advantageously, adding information to the charge number field and the OLI field to a 15 digit CPN allows class 4 switch 625 to complete the call to an end location with the calling party number intact. Class 4 switch 625 will connect the call even though the calling party number fits an international format because a populated charge number field indicates the call can be charged to a customer. Similarly, a populated OLI field indicates to class 4 switch 625 a line from which calls should be connected. The call could terminate within the PSTN or to an international location. If the call terminates to an international location, the class 4 switch 625 would connect the call to a DMS 300 switch for transport to an international telecommunication network. A DMS 300 switch could also support the operation described by FIG. 7.

Figure 9:
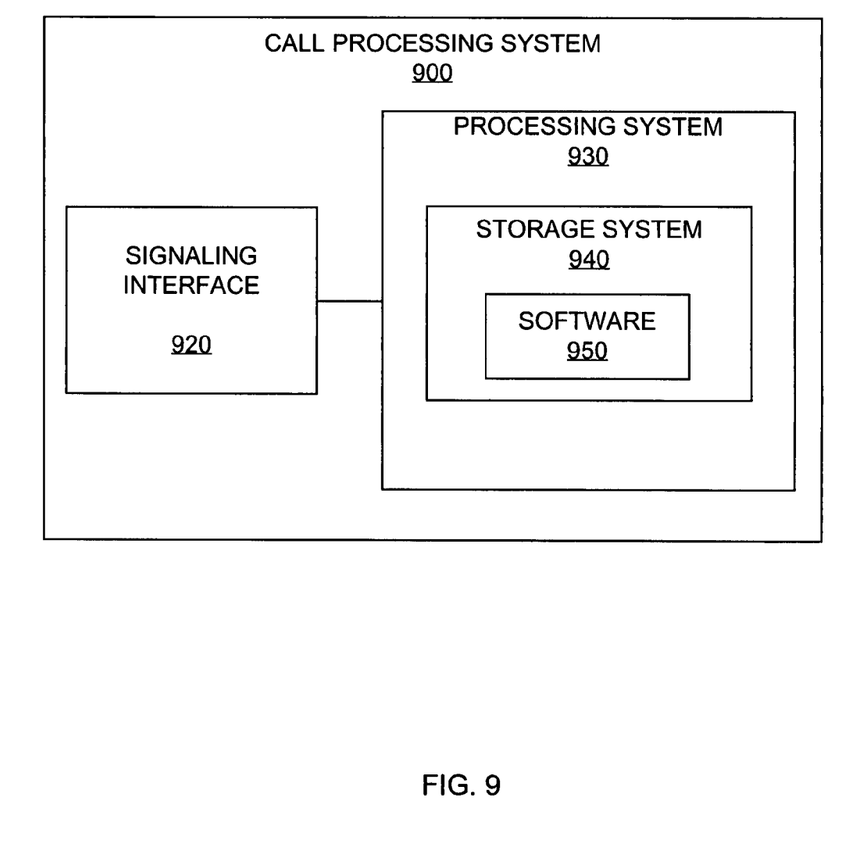
FIG. 9 illustrates a call processing system in an embodiment of the invention.

Call Processing System—FIG. 9

FIG. 9 illustrates call processing system 900 in an embodiment of the invention. Call processing system 900 includes signaling interface 920, processing system 930, storage system 940, and software 950. Storage system 940 stores software 950. Processing system 930 is linked to signaling interface 920. Call processing system 900 could be comprised of a programmed general-purpose computer, although those skilled in the art will appreciate that programmable or special purpose circuitry and equipment may be used. Call processing system 900 may use a client server architecture where operations are distributed among a server system and client devices that together comprise elements 920-950.

Signaling interface 920 could comprise a network interface card, modem, port, or some other communication device. Signaling interface 920 may be distributed among multiple communication devices. Processing system 930 could comprise a computer microprocessor, logic circuit, or some other processing device. Processing system 930 may be distributed among multiple processing devices. Storage system 940 could comprise a disk, tape, integrated circuit, server, or some other memory device. Storage system 940 may be distributed among multiple memory devices.

Processing system 930 retrieves and executes software 950 from storage system 940. Software 950 may comprise an operating system, utilities, drivers, networking software, and other software typically loaded onto a general-purpose computer. Software 950 could also comprise an application program, firmware, or some other form of machine-readable processing instructions. When executed by the processing system 930, software 950 directs processing system 930 to operate as described for call processing system 110, 330, and IRSP 630.

What is claimed is:

1. A call processing system for handling a call comprising:
   a signaling interface configured to receive an initial address message from a mobile carrier switch wherein the initial address message comprises a plurality of fields; and
   a processing system configured to process the initial address message to determine if a field of the plurality of fields of the initial address message is populated and populate the field if the field is not populated, resulting in a modified initial address message; and
   the signaling interface further configured to transmit the modified initial address message to a routing system.

2. The call processing system of claim 1 wherein the routing system comprises a switch of a public switched telephone network (PSTN).

3. The call processing system of claim 2 wherein the switch comprises a class 4 switch.

4. The call processing system of claim 1 wherein the field comprises a charge number field and the charge number field is populated with a pseudo charge number.

5. The call processing system of claim 4 wherein the routing system is configured to receive the modified initial address message and allow the call based on the pseudo charge number.

6. The call processing system of claim 1 wherein the field comprises an originating line identification field and the originating line identification field is populated with pseudo originating line identification number.

7. The call processing system of claim 6 wherein the routing system is configured to receive the modified initial address message and allow the call based on the pseudo originating line identification number.

8. The call processing system of claim 1 wherein the call processing system comprises a service control point (SCP).

9. A method of operating a communication system, the method comprising:
   receiving an initial address message into a call processing system from a mobile carrier switch wherein the initial address message comprises a plurality of fields;
   processing the initial address message to determine if a field of the plurality of fields of the initial address message is populated;
   populating the initial address message if the field is not populated, resulting in a modified initial address message; and
   transmitting the modified initial address message to a routing system.

10. The method of claim 9 wherein the routing system is configured to transmit the initial address message to the call processing system in response to receiving the initial address message from the mobile carrier switch.

11. The method of claim 9 wherein the routing system comprises a switch of the public switched telephone network (PSTN).

12. The method of claim 11 wherein the switch comprises a class 4 switch.

13. The method of claim 9 wherein the field comprises a charge number field.

14. The method of claim 13 wherein the charge number field is populated with a pseudo charge number and wherein the call is allowed based on the pseudo charge number.

15. The method of claim 9 wherein the field comprises an originating line identification field.

16. The method of claim 15 wherein the originating line identification field is populated with a pseudo originating line identification number and wherein the call is allowed based on the pseudo originating line identification number.

17. A non-transitory computer readable medium having program instructions stored thereon for operating a call processing system that, when executed by the call processing system, direct the call processing system to:

receive an initial address message wherein the initial address message comprises a plurality of fields;

process the initial address message to determine if a field of the plurality of fields of the initial address message is populated and populate the field if the field is not populated, resulting in a modified initial address message; and transmit the modified initial address message.

* * * * *